United States Patent

Strandjord et al.

(10) Patent No.: US 8,103,140 B2
(45) Date of Patent: Jan. 24, 2012

(54) INTERFEROMETRIC FIBER OPTIC GYROSCOPE WITH SILICON OPTICAL BENCH FRONT-END

(75) Inventors: Lee Strandjord, Tonka Bay, MN (US); Jenni Strabley, Maple Grove, MN (US); James F. Detry, Plymouth, MN (US)

(73) Assignee: Honeywell International Inc., Morristown, NJ (US)

( * ) Notice: Subject to any disclaimer, the term of this patent is extended or adjusted under 35 U.S.C. 154(b) by 249 days.

(21) Appl. No.: 12/476,117

(22) Filed: Jun. 1, 2009

(65) Prior Publication Data

US 2010/0301352 A1    Dec. 2, 2010

(51) Int. Cl.
- G02B 6/26 (2006.01)
- H04J 14/02 (2006.01)
- G01B 9/02 (2006.01)
- H01L 21/00 (2006.01)
- H01L 33/00 (2006.01)
- H01L 21/50 (2006.01)
- G01C 19/72 (2006.01)

(52) U.S. Cl. ......... 385/52; 385/14; 385/129; 385/11; 385/33; 398/79; 398/88; 356/450; 438/29; 257/E33.076; 257/E21.499; 257/84

(58) Field of Classification Search ........... 385/33, 385/35, 24, 52, 74, 90, 91, 92, 93, 14, 129, 385/130, 131, 132, 11; 398/79, 88, 101, 398/129, 156; 356/450, 477, 478, 490, 500, 356/508, 138, 153, 399, 460; 438/25, 29, 438/31; 257/84, E33.076, E21.499

See application file for complete search history.

(56) References Cited

U.S. PATENT DOCUMENTS

| | | | |
|---|---|---|---|
| 5,481,629 A * | 1/1996 | Tabuchi | 385/14 |
| 5,684,590 A * | 11/1997 | Sanders et al. | 356/460 |
| 5,854,867 A | 12/1998 | Lee et al. | 385/49 |
| 7,183,759 B1 * | 2/2007 | Malendevich et al. | 324/750.22 |
| 7,227,644 B2 * | 6/2007 | Anson et al. | 356/460 |
| 2005/0074213 A1 | 4/2005 | Lin et al. | 385/88 |
| 2006/0146425 A1 * | 7/2006 | Zimmermann | 359/819 |
| 2006/0174652 A1 * | 8/2006 | Khanarian et al. | 65/38 |
| 2007/0229838 A1 | 10/2007 | Greening et al. | 356/460 |
| 2010/0301352 A1 * | 12/2010 | Strandjord et al. | 257/84 |

FOREIGN PATENT DOCUMENTS

| | | |
|---|---|---|
| EP | 0475013 | 3/1992 |
| EP | 0640853 | 7/1994 |
| EP | 0961104 | 12/1999 |
| EP | 1847804 | 10/2007 |
| EP | 1844741 | 2/2008 |
| EP | 1906146 | 4/2008 |

OTHER PUBLICATIONS

European Patent Office, "European Search Report", Sep. 1, 2010, Published in: EP.

* cited by examiner

*Primary Examiner* — Brian Healy
(74) *Attorney, Agent, or Firm* — Fogg & Powers LLC (57) ABSTRACT

Method and apparatus are provided for a silicon substrate optical system for use in an interferometric fiber optic gyroscope (IFOG). A silicon substrate of the silicon substrate optical system is etched to receive optical components, including an input optical fiber, a pump source, a wavelength division multiplier, an isolator, a polarizing isolator, a beam splitting device, a PM tap coupler, a relative intensity noise (RIN) photodiode, a system photodiode, and an output optical fiber. The optical components are mounted on a silicon substrate to reduce the size and cost of the IFOG and increase reliability.

19 Claims, 7 Drawing Sheets

INTERFEROMETRIC FIBER OPTIC GYROSCOPE WITH SILICON OPTICAL BENCH FRONT-END

BACKGROUND OF THE INVENTION

Gyroscopes have been used to measure rotation rates or changes in angular velocity about an axis of rotation. A basic conventional fiber optic gyroscope (FOG) includes a light source, a beam generating device, and a fiber optic coil coupled to the beam generating device that encircles an area. Rotation about the axis normal to the fiber optic coil either slows or speeds the propagation of the light through the coil, resulting in a measureable shift in phase of the light.

In an interferometric fiber optic gyroscope (IFOG), the light source is split into two beams that propagate in opposite directions through the fiber optic coil. After propagating through the coil, the two beams of light are recombined to compare the phase upon exit from the coil. Recombining the beam produces an interference pattern indicative of the phase of the respective beams. At a detector, shifts in the interference pattern are proportional to the phase difference between the two recombined beams. Measurement of the shifts in the interference pattern indicates a speed and direction of rotation about the axis of the coil.

The IFOG includes a number of fiber optic components that must be optically connected to form beam paths from the light source. Fusion splicing is used to operatively weld the optical components to form the necessary light paths. Fusion splicing and stowage processes add many manual process steps to IFOG manufacturing, thus having a significant contribution to IFOG cost along with that of the discrete optical components. Rather than fusion and manual assembly, there is a need, in the art, to exploit the automated methods of fabrication to produce an IFOG.

Silicon optical bench (SiOB) is an emerging technology that offers the capability of automated manufacturing of high density and highly functional optical systems in a very small package at low cost. SiOBs are optical benches formed from silicon or a similar semiconductor material. Troughs are etched in the silicon material, or substrate, using micro-fabrication processes, to hold the various optical components. The high accuracy of the micro-fabrication process allows the optical components and optical fibers to be precisely aligned relative to one another in the various troughs. The self-aligning quality of the optical components upon placement in a suitably formed silicon substrate allows for "passive alignment" of the components and reduces the need to actively ensure the various components are aligned with to suitably form an efficient optical path. Light may also be directed between the various optical components using free space optics such as lenses etc.

The benefits of SiOBs include lower cost of production as well as reduced size and mass due to wafer scale fabrication of the silicon optical bench together with enhanced gyroscope performance compared with conventional fabrication techniques. However, the SiOB technology has not been exploited in the context of more complex component such as the IFOG, but rather has been used for communications applications which are generally passive components.

SUMMARY OF THE INVENTION

The present invention integrates IFOG passive optical and active electro-optical functions onto a single silicon substrate. Because the silicon substrate employs self-aligning features, the silicon substrate optical system can be manufactured with automation, thus greatly reducing the cost of the IFOG. Furthermore, since long optical components with fiber pigtails are removed from the design, an IFOG with a silicon substrate optical front-end can be much smaller, thus increasing reliability and further reducing cost.

BRIEF DESCRIPTION OF THE DRAWINGS

Preferred and alternative embodiments of the present invention are described in detail below with reference to the following drawings.

DETAILED DESCRIPTION OF THE INVENTION

Figure 1:
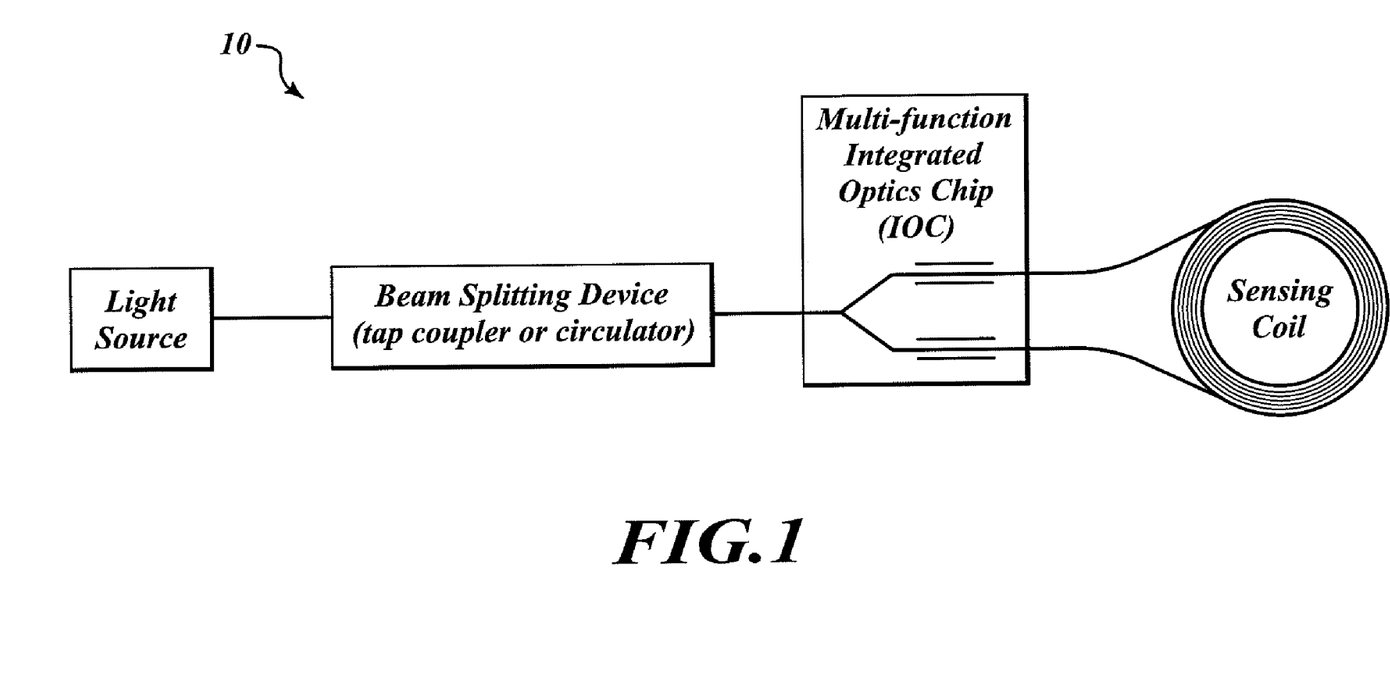
FIG. 1 is block diagram of an interferometric fiber optic gyroscope (IFOG)

The present invention integrates passive optical and active electro-optical functions of an interferometric fiber optic gyroscope (IFOG), onto a single silicon substrate. An example of an IFOG is shown in FIG. 1. Optical front-end components, also known as commercial off-the-shelf (COTS) optical components, can be purchased in unpackaged form and assembled onto the single silicon substrate, decreasing the size and cost of the IFOG while increasing the reliability. In an exemplary embodiment, the invention includes a silicon substrate optical system consisting of a silicon substrate on which COTS optical components are assembled. The silicon substrate optical system is referenced in FIG. 2 below.

Figure 2:
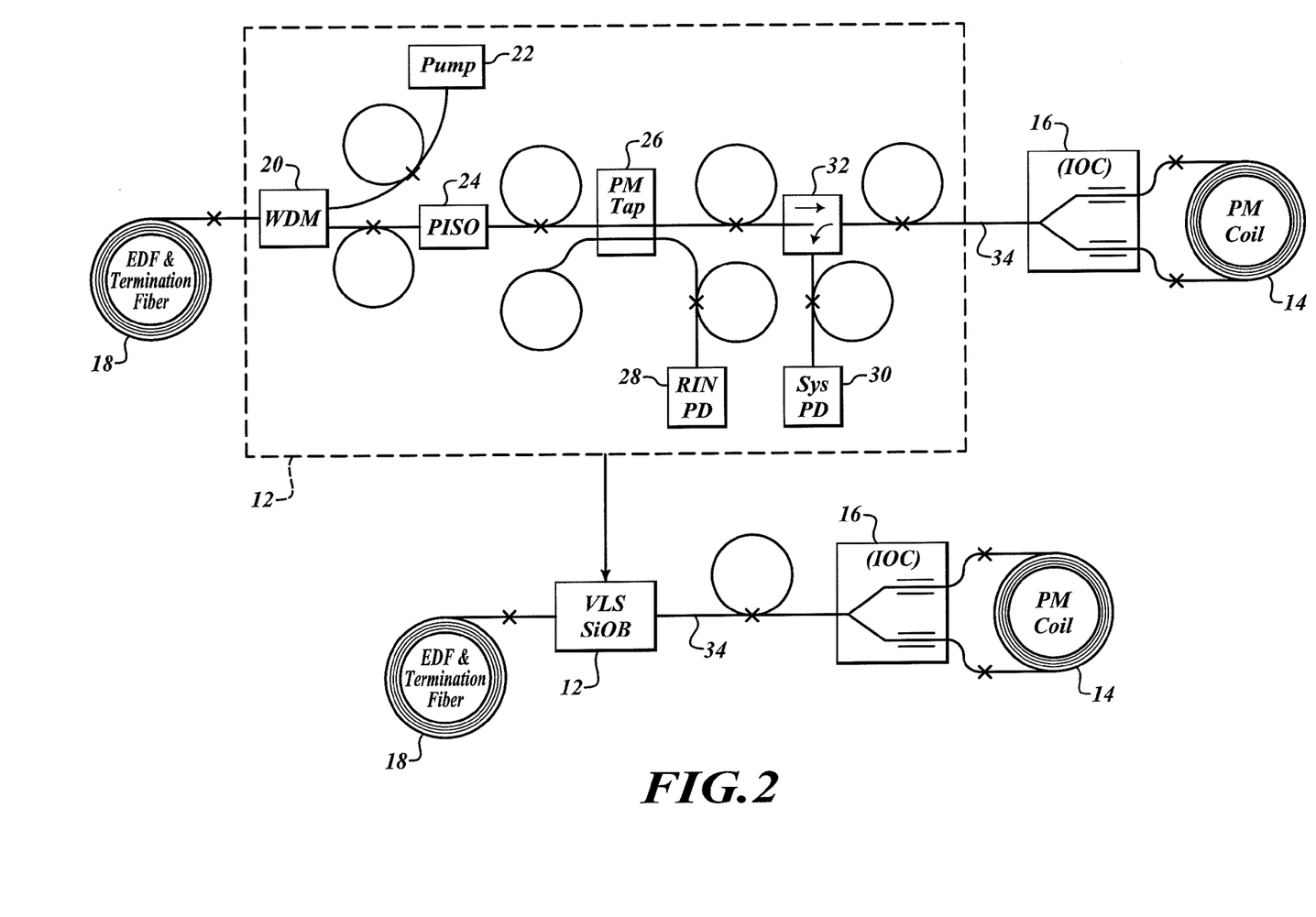
FIG. 2 is a partial schematic diagram of an IFOG in accordance with an exemplary embodiment of the present invention.

FIG. 2 is a partial schematic diagram of an IFOG in accordance with the present invention. In general, a silicon substrate optical system 12 comprises a plurality of COTS optical components. In the exemplary embodiment of FIG. 2, the COTS optical components include a wavelength division multiplier (WDM) 20, a pump source 22, a polarizing isolator (PISO) 24, a polarization maintaining (PM) tap coupler 26, a relative intensity noise (RIN) photodiode 28, a system photodiode 30 and a beam splitting device 32, such as a circulator or tap coupler. In a conventional arrangement, each optical component is connected by long optical fibers, or fiber pigtails. In the exemplary embodiment, the COTS optical components are placed on a suitably formed silicon substrate. The self-aligning quality of COTS optical components upon placement on the silicon substrate allows for "passive alignment" of the COTS optical components. "Passive alignment" removes the need to connect the COTS optical components with long optical fibers. The silicon substrate optical system 12 can then be inserted between an input fiber 34 exiting an integrated optical chip (IOC) 16 and a combination erbium-doped fiber (EDF) and termination fiber 18. The term "integrated optics" refers in general to a class of devices for guiding and controlling light in narrow waveguide channels formed in suitable substrates. Integrated optical devices include optical waveguides, switches, polarizers, phase modulators and other functional devices. Several functional devices may be combined, or "integrated", on a single substrate, or "optical chip". IOC 16 integrates a beam splitter 44 and one or more phase modulators 46. The exemplary silicon substrate optical system 12 in FIG. 2 enables the removal of the long optical components with fiber pigtails, thereby increasing reliability and reducing the size of the IFOG.

The COTS optical components assembled on a silicon substrate are more efficient, cost effective and produce a smaller IFOG than individual optical components connected to one another via long optical fibers, as shown in FIG. 2. An electrical component is encapsulated or potted to become immediately more durable. Currently, long optical fibers between each individual optical component must be carefully wound into a bundle for stowage inside a shell containing an IFOG. In the exemplary embodiment, long optical fibers are not required to connect COTS optical components. Instead, unobstructed free-space paths are created in the silicon substrate to allow for self-alignment of COTS optical components and transmitting optical data in the form of light signals to each COTS optical component. The size of the IFOG is generally dictated by the necessity of containing the length of the optical component as well as the shell volume necessary to contain the fiber pigtails. This volume, in turn is dictated by the minimum bend radius of the fiber pigtails that can be achieved without sacrificing good reliability. In the exemplary embodiment, placement of COTS optical components is facilitated as on a SiOB, the COTS components can be smaller, less expensive and when integrated into the silicon, do not require the fiber pigtails connections.

Figure 3:
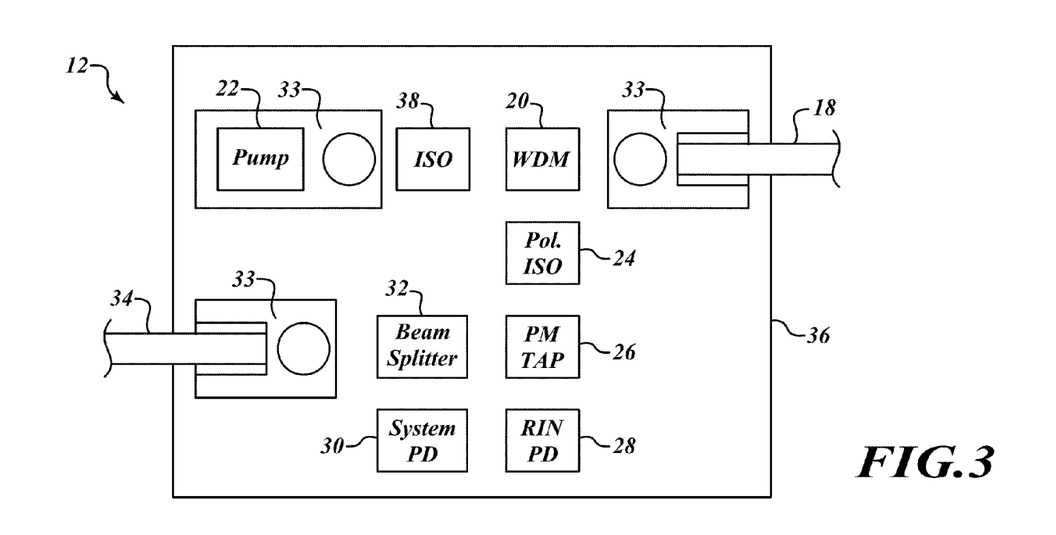
FIG. 3 is a block diagram of the exemplary embodiment shown in FIG. 2.
Figure 4:
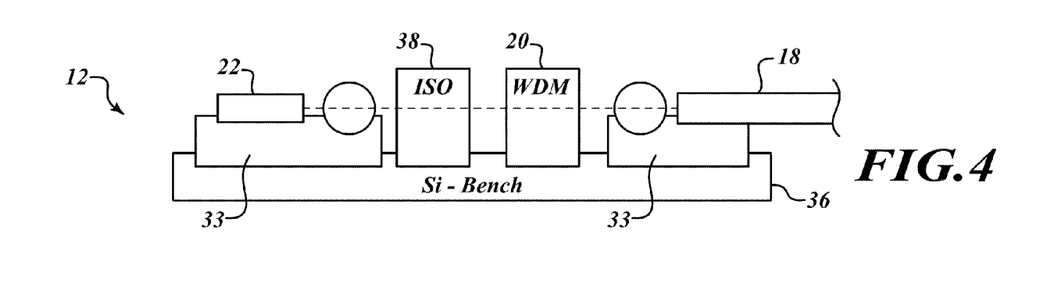
FIG. 4 is an alternative view of FIG. 3.

FIGS. 3 and 4 are block diagrams of the exemplary embodiment shown in FIG. 2. The COTS optical components are mounted by hybrid means on a silicon substrate 36 and on pedestals 33. In the exemplary embodiment of FIG. 3, the COTS optical components include the wavelength division multiplier (WDM) 20, an isolator 38, the pump source 22, the polarizing isolator (PISO) 24, the PM tap coupler 26, the relative intensity noise (RIN) photodiode 28, the system photodiode 30 and the beam splitting device 32. Coupling optics for input fiber 34 and the combination erbium-doped fiber (EDF) and termination fiber 18 are also shown on the silicon substrate optical system 12. FIG. 4 provides a side view of the exemplary embodiment shown in FIG. 2 to illustrate the self-aligning feature of the silicon substrate 36.

Placement of the COTS optical components by use of hybrid means facilitated by the use of silicon substrate 36 lowers the cost of IFOG production as well as reduces size and mass due to wafer scale fabrication of the silicon optical bench together with enhanced gyroscope performance compared with conventional fabrication techniques. Micro-fabrication of silicon substrate 36 allows precise placement and dimensioning of suitable troughs and pedestals 33 for mounting the COTS optical components and optical fibers which, themselves are, thus, precisely aligned relative to one another. The self-aligning quality of the COTS optical components upon placement in a suitably formed silicon substrate 36 and pedestals 33 allows for "passive alignment" of the COTS optical components and reduces the need to actively ensure the various components of the silicon substrate optical system are aligned with one another.

Figure 5:
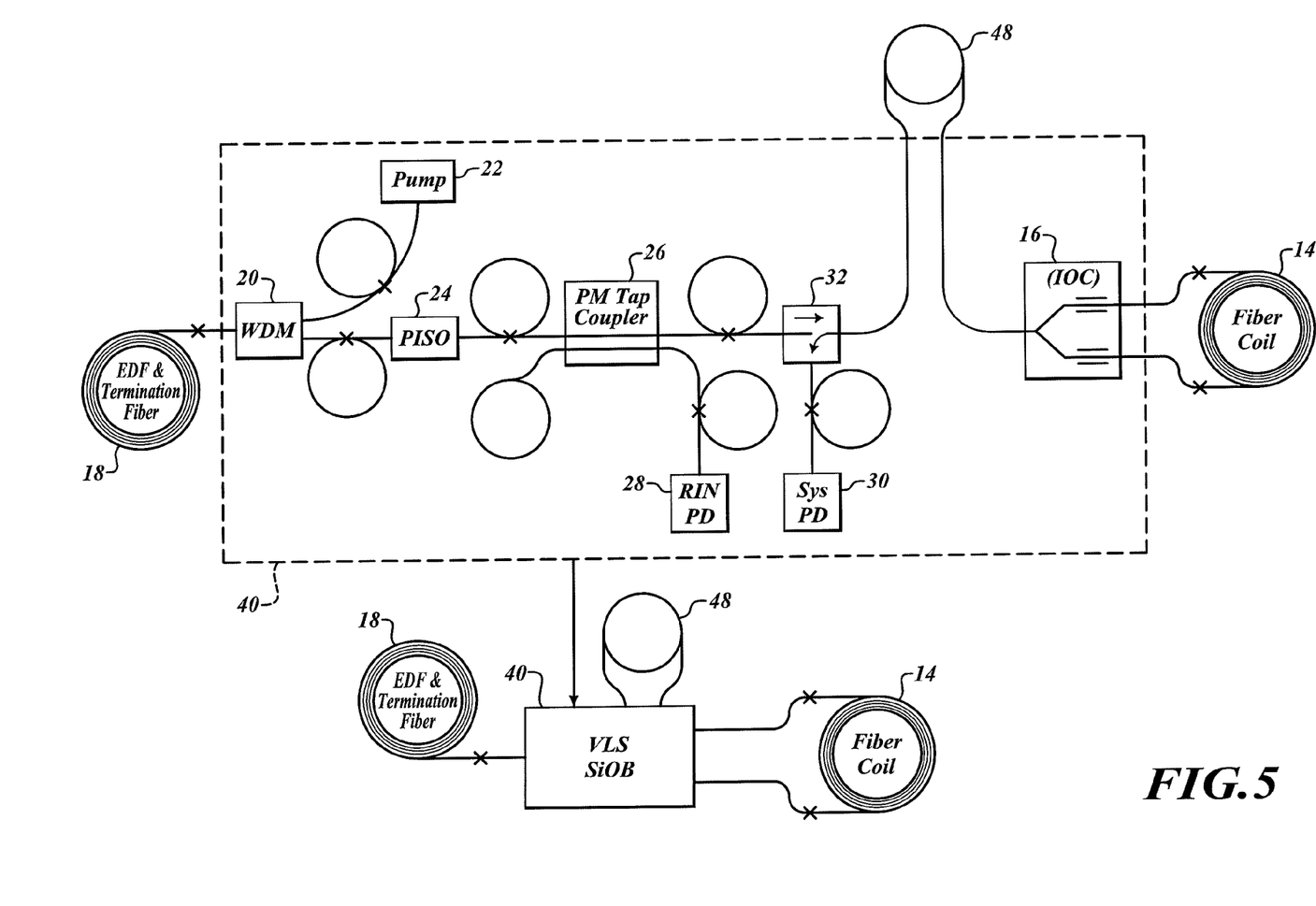
FIG. 5 is a partial schematic diagram of an IFOG in accordance with an alternative exemplary embodiment of the present invention.

In an alternative exemplary embodiment, as shown in FIG. 5, the silicon substrate optical system 40 includes COTS optical components such as the wavelength division multiplier (WDM) 20, the pump source 22, the polarizing isolator (PISO) 24, the PM tap coupler 26, the relative intensity noise (RIN) photodiode 28, the system photodiode 30, the beam splitting device 32, and a spatial mode filter 48. In addition, the COTS optical components of the IOC 16 are included on the alternative silicon substrate optical system 40. As stated before, in a conventional arrangement, each optical is connected by long optical fibers, or fiber pigtails. In the exemplary embodiment, the COTS optical components are placed on a suitably formed silicon substrate. The self-aligning quality of COTS optical components upon placement on the silicon substrate allows for "passive alignment" of the COTS optical components. "Passive alignment" removes the need to connect the COTS optical components with long optical fibers. The alternative silicon substrate optical system 40 can then be inserted between a fiber coil 14 and the combination erbium-doped fiber (EDF) and termination fiber 18. The spatial mode filter 48, which typically consists of a length of single-mode optical fiber, is located between the beam splitting device 32 and the IOC 16. The spatial mode filter 48 is necessary for removing higher optical modes that can propagate through the IOC 16. The exemplary alternative silicon substrate optical system 40 in FIG. 5 enables the removal of additional long optical components with fiber pigtails 34, increasing the reliability and further reducing the size of the IFOG.

Light from the pump source 22 is sent to the combination erbium-doped fiber (EDF) and termination fiber 18 through the wavelength division multiplier (WDM) 20, the polarizing isolator 24, the beam splitting device 32 and the IOC 16. The pump source 22 outputs a wavelength light signal through an isolator 38 to the WDM 20, which directs the light into the combination erbium-doped fiber (EDF) and termination fiber 18. The EDF emits light in both directions, with the light emitted in the forward direction exiting the EDF 18 through the termination fiber 18 and the light emitted in the reverse direction emitted back towards the WDM 20. The light emitted back to the WDM 20 by the EDF 18 is at a wavelength such that it becomes coupled into the fiber leg not connected to the pump source 22. The isolator 38 eliminates any adverse effects caused by the light emitted back to the WDM 20, such as poor transmission performance from the destabilization effect on the oscillation of the laser source. Light emitted from the EDF 18 goes back through the WDM 20 to the polarizing isolator 24 to become an output of fiber light source. The polarizing isolator 24 linearly polarizes the light. The PM tap coupler 26 takes the light and diverts a portion of the light to the RIN photodiode 28. The beam splitting device 32 takes the other portion of the light and directs it to the spatial mode filter 48, then the IOC 16, which splits the light into clockwise and counter clockwise waves. After propagating through the fiber coil 14, the waves recombine at the IOC 16, propagate though the spatial mode filter 48, and the beam splitting device 32 works in reverse with the light sent to the system photodiode 30 to detect the Sagnac effect caused by rotation of the fiber coil 14. The PM tap coupler 26 and the RIN photodiode 28 are employed to compensate for RIN noise, due to inherent fluctuations of the light generated by the pump source 22.

Figure 6:
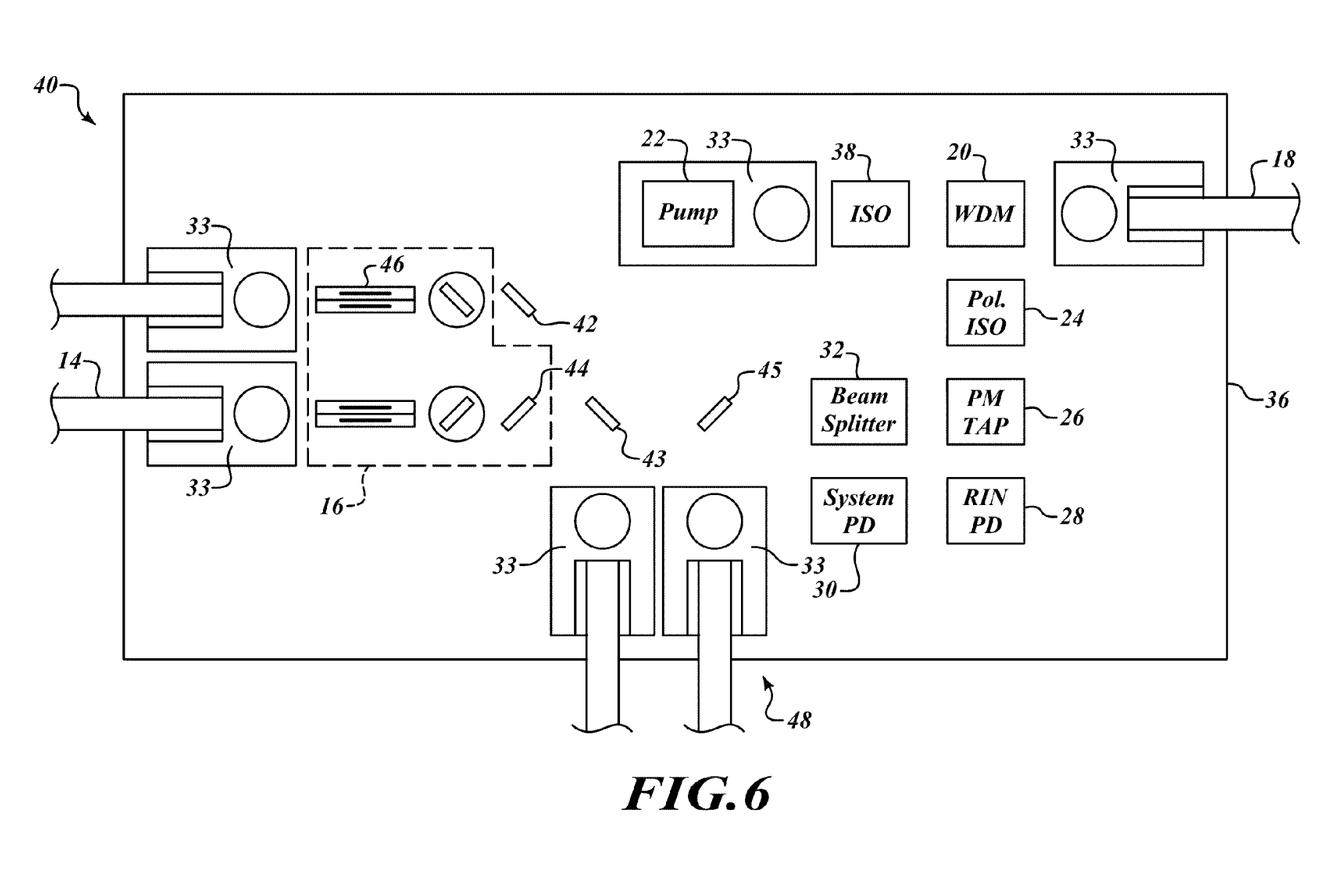
FIG. 6 is a simplified block diagram of the method to produce the alternative exemplary embodiment shown in FIG. 5.

FIG. 6 is a simplified block diagram of the method to produce the alternative exemplary embodiment shown in FIG. 5. The COTS optical components are mounted in hybrid fashion on the silicon substrate 36 or on pedestals 33. In the alternative exemplary embodiment of FIG. 5, the COTS optical components include the wavelength division multiplier (WDM) 20, the isolator 38, the pump source 22, the polarizing isolator (PISO) 24, the PM tap coupler 26, the relative intensity noise (RIN) photodiode 28, the system photodiode 30 and the beam splitting device 32. The additional COTS optical components include mirrors 42, 43 and 45, and a beam splitter 44 and one or more phase modulators 46 for the IOC 16. Coupling optics for the fiber coil 14, spatial mode filter 48 and the combination erbium-doped fiber (EDF) and termination fiber 18 are also shown on the alternative silicon substrate optical system 40.

Figure 7:
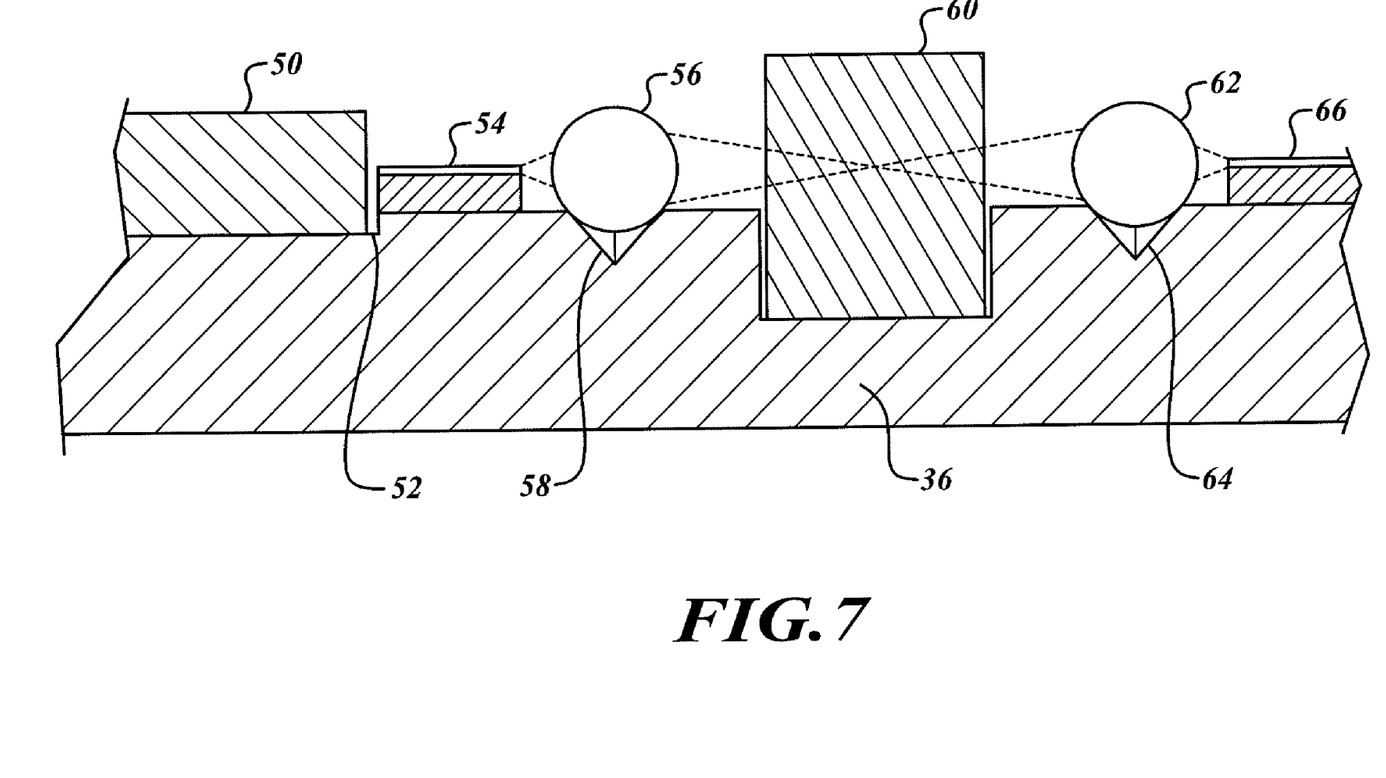
FIG. 7 is a block diagram of a method of fabrication in accordance with an exemplary embodiment of the present invention.

FIG. 7 is a block diagram of a method of fabrication in accordance with an exemplary embodiment of the present invention. The silicon substrate 36 is etched to form troughs to receive the COTS optical components. General examples of such COTS optical components and corresponding troughs are shown in FIG. 7. An optical fiber 50 can be locked in a corresponding V-groove 52 etched into the silicon substrate 36. Ball lenses 56 and 62 are arranged in pyramidal trenches 58 and 64, also etched into the silicon substrate 36. An isolator 60 can be located in a corresponding recess, while waveguides 54 and 66 can be produced directly on the silicon substrate 36.

As stated previously, micro-fabrication of silicon substrate 36 allows precise placement and dimensioning of suitable troughs for mounting the COTS optical components and optical fibers which themselves are, thus, precisely aligned relative to one another. The self-aligning quality of the COTS optical components upon placement in a suitably formed silicon substrate 36 allows for "passive alignment" of the COTS optical components and reduces the need to actively ensure the various components of the silicon substrate optical system are aligned with one another.

Figure 8:
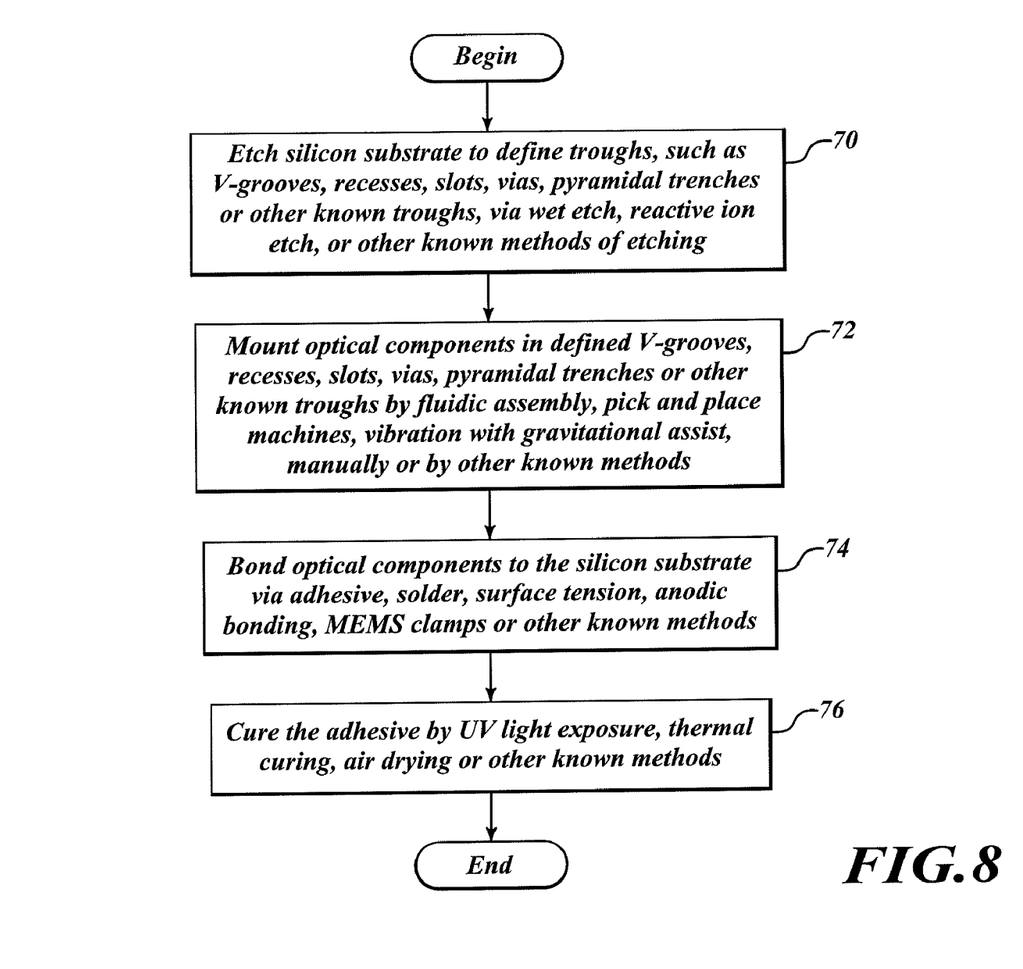
FIG. 8 is a flowchart of a method of fabrication in accordance with an exemplary embodiment of the present invention.

FIG. 8 is a flowchart of a method of fabrication in accordance with an exemplary embodiment of the present invention. The method begins at step 70. The silicon substrate 36 (FIG. 4) is etched to define troughs. The troughs can be V-grooves 52 (FIG. 7), recesses, slots, vias, pyramidal trenches 58 and 64 (FIG. 6), or other known troughs, as well as pedestals. The etching at step 70 can include a wet etch, such as potassium hydroxide (KOH), a reactive ion etch, or any known method for etching silicon. The silicon substrate 36 (FIG. 4) is etched to define the troughs in "passive alignment" to receive and optically align the COTS optical components.

The COTS optical components are mounted on the silicon substrate 36 (FIG. 4) at step 72. The COTS optical components include the wavelength division multiplier (WDM) 20 (FIG. 3), the pump source 22 (FIG. 3), the polarizing isolator (PISO) 24 (FIG. 3), the PM tap coupler 26 (FIG. 3), the relative intensity noise (RIN) photodiode 28 (FIG. 3), the system photodiode 30 (FIG. 3), the beam splitting device 32 (FIG. 3) and the isolator 38 (FIG. 3). In the alternative exemplary embodiment in FIG. 5, the COTS optical components of the IOC 16 (FIG. 5) are included on the alternative silicon substrate optical system 40 (FIG. 5). The COTS optical components of the IOC 16 (FIG. 5) are the beam splitter 44 (FIG. 6) and the one or more phase modulators 46 (FIG. 6). Mounting of all the COTS optical components onto the silicon substrate 36 (FIG. 4) at step 72 is achieved by fluidic assembly, pick and place machines, vibration with gravitational assist, manually, or by other known methods.

Bonding of the COTS optical components to the silicon substrate 36 (FIG. 4) at step 74 is achieved by adhesive, solder, surface tension, anodic bonding, MEMS clamps or other known methods. The adhesive of step 74 is cured at step 76 by UV light exposure, thermal curing, air drying, or other known methods.

While the preferred embodiment of the invention has been illustrated and described, as noted above, many changes can be made without departing from the spirit and scope of the invention. Accordingly, the scope of the invention is not limited by the disclosure of the preferred embodiment. Instead, the invention should be determined entirely by reference to the claims that follow.

The embodiments of the invention in which an exclusive property or privilege is claimed are defined as follows:

1. A substrate optical system comprising:
a substrate comprising:
one or more recesses configured to receive one or more isolators in optical alignment;
one or more pedestals positioned within one or more troughs on the substrate, the one or more pedestals configured to receive at least one of one or more photodiodes and one or more pump sources in optical alignment, wherein the one or more pedestals are distinct elements from the substrate;
one or more V-grooves configured to receive one or more optical fibers in optical alignment;
one or more pyramidal trenches configured to receive one or more ball lenses in optical alignment;
one or more slots configured to receive one or more polarizing isolators in optical alignment;
one or more vias configured to receive one or more wavelength division multiplexers in optical alignment, all aligned for use in an interferometric fiber optic gyroscope (IFOG); and
wherein the placement and dimensioning of the recesses, the pedestals, the V-grooves, the pyramidal trenches, the slots, and the vias facilitates passive alignment of the isolators, the at least one of the photodiodes and pump sources, the optical fibers, the ball lenses, the polarizing isolators, and the wavelength division multiplexers.

2. The system of claim 1, wherein at least one of the isolators, photodiodes, pump sources, optical fibers, beam splitters, polarizing isolators, and wavelength division multipliers are unpackaged optical components.

3. The system of claim 1, wherein the substrate further comprises an integrated optical chip.

4. The system of claim 3, wherein the integrated optical chip further comprises one or more beam splitters and one or more phase modulators.

5. A method of fabrication of a substrate optical system, the method comprising:
etching a substrate, wherein etching the substrate defines one or more recesses configured to receive one or more isolators, one or more V-grooves configured to receive one or more optical fibers, one or more pyramidal trenches configured to receive one or more ball lenses, one or more slots configured to receive one or more polarizing isolators, or one or more vias configured to receive one or more wavelength division multiplexers, all in optical alignment;
positioning one or more pedestals within one or more troughs on the substrate, the one or more pedestals configured to receive at least one of one or more photodiodes and one or more pump sources, wherein the one or more pedestals are distinct elements from the substrate;
mounting by fluidic assembly the one or more isolators in the substrate defining the one or more recesses, the at least one of the one or more photodiodes and the one or more pump sources on the one or more pedestals, the one or more optical fibers in the substrate defining the one or more V-grooves, the one or more ball lenses in the substrate defining the one or more pyramidal trenches, the one or more polarizing isolators in the substrate defining the one or more slots, or the one or more wavelength division multiplexers in the substrate defining the one or more vias, all in optical alignment;

bonding via an adhesive the one or more isolators to the substrate defining the one or more recesses, the at least one of the one or more photodiodes and the one or more pump sources to the one or more pedestals, the one or more optical fibers to the substrate defining the one or more V-grooves, the one or more ball lenses to the substrate defining the one or more pyramidal trenches, the one or more polarizing isolators to the substrate defining the one or more slots, or the one or more wavelength division multiplexers to the substrate defining the one or more vias;

curing the adhesive; and wherein the placement and dimensioning of the recesses, the pedestals, the V-grooves, the pyramidal trenches, the slots, and the vias facilitates passive alignment of the isolators, the at least one of the photodiodes and pump sources, the optical fibers, the ball lenses, the polarizing isolators, and the wavelength division multiplexers.

6. The method of claim 5, further comprising etching the substrate to receive unpackaged optical components.

7. The method of claim 5, further comprising etching the substrate to receive an integrated optical chip.

8. The method of claim 7, wherein etching the substrate defines one or more slots to receive one or more mirrors, one or more pyramidal trenches to receive one or more ball lenses, or one or more recesses to receive one or more phase modulators of the integrated optical chip.

9. The method of claim 5, further comprising etching via wet etch, such as potassium hydroxide (KOH), reactive ion etch, or any known method for etching.

10. The method of claim 5, further comprising mounting manually, by pick and place machines, by vibration with gravitational assist, or other known methods.

11. The method of claim 5, further comprising bonding via at least one of solder, surface tension, anodic bonding, and MEMS clamps.

12. The method of claim 5, further comprising curing the adhesive by at least one of UV light exposure, thermal curing, and air drying.

13. The system of claim 1, wherein the one or more pyramidal trenches are formed in the one or more pedestals.

14. A substrate optical system comprising:

a substrate;

a plurality of troughs positioned in the substrate and configured to receive first optical components;

a plurality of pedestals positioned within one or more troughs of the plurality of troughs on the substrate and configured to receive second optical components, wherein the pedestals are distinct elements from the substrate; and wherein the placement and dimensioning of the troughs and pedestals facilitates passive alignment of the first optical components positioned in the troughs with the second optical components positioned on the pedestals.

15. The system of claim 14, wherein the first optical components are taller than the second optical components.

16. The system of claim 14, wherein the first optical components and the second optical components are aligned for use in an interferometric fiber optic gyroscope (IFOG).

17. The system of claim 1, wherein the substrate is a silicon substrate.

18. The method of claim 5, wherein the substrate is a silicon substrate.

19. The system of claim 14, wherein the substrate is a silicon substrate.

* * * * *